(12) United States Patent
Kono

(10) Patent No.: US 11,215,898 B2
(45) Date of Patent: Jan. 4, 2022

(54) OPTICAL MODULATOR

(71) Applicant: SUMITOMO ELECTRIC INDUSTRIES, LTD., Osaka (JP)

(72) Inventor: Naoya Kono, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/033,246

(22) Filed: Sep. 25, 2020

(65) Prior Publication Data
US 2021/0116775 A1 Apr. 22, 2021

(30) Foreign Application Priority Data
Oct. 16, 2019 (JP) ............................. JP2019-189596

(51) Int. Cl.
*G02F 1/225* (2006.01)
*G02B 6/122* (2006.01)
*G02B 6/12* (2006.01)
*G02F 1/21* (2006.01)

(52) U.S. Cl.
CPC ....... *G02F 1/2257* (2013.01); *G02B 6/12007* (2013.01); *G02B 6/1228* (2013.01); *G02F 1/212* (2021.01)

(58) Field of Classification Search
USPC ........................................................ 385/1–3
See application file for complete search history.

(56) References Cited

U.S. PATENT DOCUMENTS

| 7,343,070 | B2 * | 3/2008 | Van Der Vliet | ...... G02B 6/1228 385/28 |
| 8,718,412 | B2 * | 5/2014 | Onishi | ............... H04B 10/5561 385/1 |
| 9,069,223 | B2 | 6/2015 | Prosyk | |
| 10,422,957 | B2 * | 9/2019 | Mekis | ..................... G02B 6/125 |
| 10,606,143 | B2 * | 3/2020 | Tanaka | .................. G02B 6/2813 |

OTHER PUBLICATIONS

Mawatari, Hiroyasu, et al., Clarification of the degradation modes of an InP-based semiconductor MZ modulator, *International Reliability Physics Symposium*, (IRPS) CD. 7, IEEE (2012).
Tanaka, Hajime, et al., Investigation of Photo Damage Mechanism of InP Multi-Valued Modulator, *Electronics Information and Communications Society, General Conferences*, C-4-4 (2019).

* cited by examiner

*Primary Examiner* — Michael P Mooney
(74) *Attorney, Agent, or Firm* — Smith, Gambrell & Russell, LLP.

(57) ABSTRACT

An optical modulator includes an input waveguide having a first width enabling a propagation of a light-beam in a single-mode, a tapered waveguide having an input end connected to the input waveguide and an output end having a second width larger than the first width, an optical demultiplexer having an input port connected to the output end, a first output port connected to a first arm waveguide, and a second output port connected to a second arm waveguide connected to the second output port, a first electrode disposed on the first arm waveguide, and a second electrode disposed on the second arm waveguide. The first arm waveguide has a third width larger than the first width. The first arm waveguide is located within a first strip region. The first strip region having a fourth width twice as large as the third width.

12 Claims, 7 Drawing Sheets

OPTICAL MODULATOR

CROSS REFERENCE TO RELATED APPLICATIONS

The present application is based upon and claims the benefit of the priority from Japanese patent application No. 2019-189596 filed on Oct. 16, 2019, which is hereby incorporated by reference in its entirety.

TECHNICAL FIELD

The present disclosure relates to an optical modulator.

BACKGROUND

U.S. Pat. No. 9,069,223 (Patent Document 1) discloses a Mach-Zehnder modulator. Non-Patent Documents 1 and 2 disclose the mechanism of optical damage to modulators.
Non-Patent Document 1: Hiroyasu Mawatari et al., "Clarification of the degradation modes of an InP-based semiconductor MZ modular," International Reliability Physics Symposium (IRPS), CD.7, IEEE (2012)
Non-Patent Document 2: Hajime Tanaka et al., "Discussion of the Photo Damage Mechanism of InP-based Multi-Value Modulators," 2019 Electronics and Communications Society General Conference, C-4-4

SUMMARY

The present disclosure provides an optical modulator including an input waveguide having a first width enabling a propagation of a light-beam in a single-mode, a tapered waveguide having an input end and an output end, the input end being connected to the input waveguide, the output end having a second width larger than the first width, an optical demultiplexer having an input port, a first output port, and a second output port, the input port being optically connected to the output end, a first arm waveguide having an input end and an output end, the input end of the first arm waveguide being connected to the first output port, a second arm waveguide having an input end and an output end, the input end of the second arm waveguide being connected to the second output port, a first electrode disposed on the first arm waveguide, and a second electrode disposed on the second arm waveguide. The first arm waveguide has a third width from the input end of the first arm waveguide to the output end of the first arm waveguide, the third width being larger than the first width. The first arm waveguide is located within a first strip region from the input end of the first arm waveguide to the output end of the first arm waveguide, the first strip region having a fourth width twice as large as the third width. The second arm waveguide has a fifth width from the input end of the second arm waveguide to the output end of the second arm waveguide, the fifth width being larger than the first width. The second arm waveguide is located within a second strip region from the input end of the second arm waveguide to the output end of the second arm waveguide, the second strip region having a sixth width twice as large as the fifth width.

BRIEF DESCRIPTION OF THE DRAWINGS

The above and other objects, features and advantages will become more apparent from the following detailed description of the preferred embodiments with reference to the accompanying drawings.

DETAILED DESCRIPTION

Figure 1:
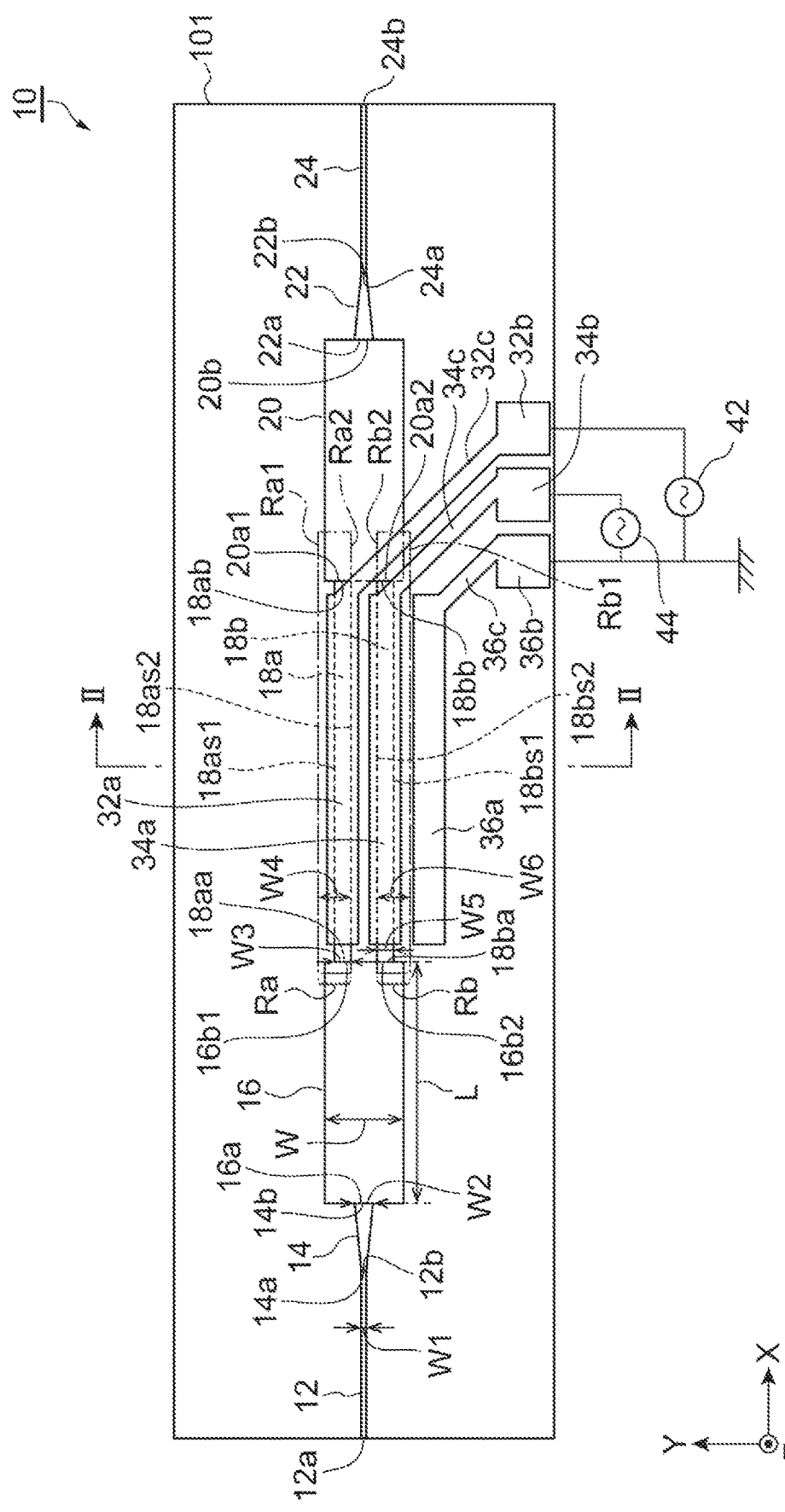
FIG. 1 is a plan view schematically showing an optical modulator according to an embodiment.

Problem to be Solved by the Present Disclosure

In the Mach-Zehnder modulator of Patent Document 1, a light from an input waveguide is divided into two by a multi-mode interference (MMI) coupler. Two arm waveguides connected to the MMI coupler have curved portions extending apart from each other and straight portions extending parallel to each other. A voltage for modulation is applied to the straight portions.

A width of each waveguide should be reduced in order to enable a propagation of a light-beam in a single-mode. In this case, a power density of the light propagating through each waveguide is increased. On the other hand, an optical absorption coefficient of a core is increased when a voltage is applied to the arm waveguides, and this may cause a material constituting the arm waveguide to deteriorate (see Non-Patent Documents 1 and 2). Therefore, when the power density of the light propagating through the arm waveguide is increased, there is also a high possibility that the material constituting the arm waveguide is deteriorated. Therefore, in order to reduce the power density, it is conceivable to increase the width of the arm waveguide. However, when the width of the arm waveguide is increased, a higher-order mode occurs in the curved portions.

One aspect of the present disclosure is to provide an optical modulator capable of suppressing the occurrence of the higher-order mode while suppressing deterioration of the material of the arm waveguide.

Description of Embodiments of the Present Disclosure

An optical modulator according to an embodiment includes an input waveguide having a first width enabling a propagation of a light-beam in a single-mode, a tapered waveguide having an input end and an output end, the input end being connected to the input waveguide, the output end having a second width larger than the first width, an optical demultiplexer having an input port, a first output port, and a second output port, the input port being optically connected to the output end, a first arm waveguide having an input end and an output end, the input end of the first arm waveguide being connected to the first output port, a second arm waveguide having an input end and an output end, the input end of the second arm waveguide being connected to the second output port, a first electrode disposed on the first arm waveguide, and a second electrode disposed on the second arm waveguide. The first arm waveguide has a third width from the input end of the first arm waveguide to the output end of the first arm waveguide, the third width being larger than the first width. The first arm waveguide is located within a first strip region from the input end of the first arm waveguide to the output end of the first arm waveguide, the first strip region having a fourth width twice as large as the third width. The second arm waveguide has a fifth width from the input end of the second arm waveguide to the output end of the second arm waveguide, the fifth width being larger than the first width. The second arm waveguide is located within a second strip region from the input end of the second arm waveguide to the output end of the second arm waveguide, the second strip region having a sixth width twice as large as the fifth width.

If the arm waveguide has a relatively small width, the power density of a light propagating through the arm waveguide is increased, and this may cause the material of the arm waveguide to deteriorate. In contrast, in the above optical modulator, since the third width of the first arm waveguide can be increased, deterioration of the material of the first arm waveguide can be suppressed. Furthermore, since the first arm waveguide is located within the first strip region having the fourth width twice as large as the third width, the first arm waveguide will not be bent too much. Therefore, the occurrence of a higher-order mode caused by the curved portions can be suppressed.

Furthermore, since the fifth width of the second arm waveguide can be increased, the deterioration of the material of the second arm waveguide can be suppressed. Furthermore, since the second arm waveguide is located within the second strip region having the sixth width twice as large as the fifth width, the second arm waveguide will not be bent significantly. Therefore, the occurrence of the higher-order mode caused by the curved portions can be suppressed. According to the above-described optical modulator, while suppressing the deterioration of the material of the first arm waveguide and the second arm waveguide, the occurrence of the higher-order mode in the first arm waveguide and the second arm waveguide can be suppressed.

The third width may be as large as the second width, and the fifth width may be as large as the second width. In this case, the occurrence of the higher-order mode in the first output port and the second output port of the optical demultiplexer can be suppressed.

The first arm waveguide may extend linearly from the input end of the first arm waveguide to the output end of the first arm waveguide, and the second arm waveguide may extend linearly from the input end of the second arm waveguide to the output end of the second arm waveguide. In this case, the occurrence of the higher-order mode in the first arm waveguide and the second arm waveguide can be suppressed further.

The distance between the first electrode and the second electrode may be larger than the distance between the first arm waveguide and the second arm waveguide. In this case, since the distance between the first electrode and the second electrode can be increased, workability when forming the first electrode and the second electrode is improved.

Details of the Embodiments of the Present Disclosure

Hereinafter, embodiments of the present disclosure will be described in detail with reference to the accompanying figures. In the description of the figures, the same reference numerals are used for the same or equivalent elements, and a repetitive description is omitted. In the figures, an X-axis direction, a Y-axis direction, and a Z-axis direction intersecting each other are shown. The X-axis direction, the Y-axis direction and the Z-axis direction are, for example, orthogonal to each other.

Figure 2:
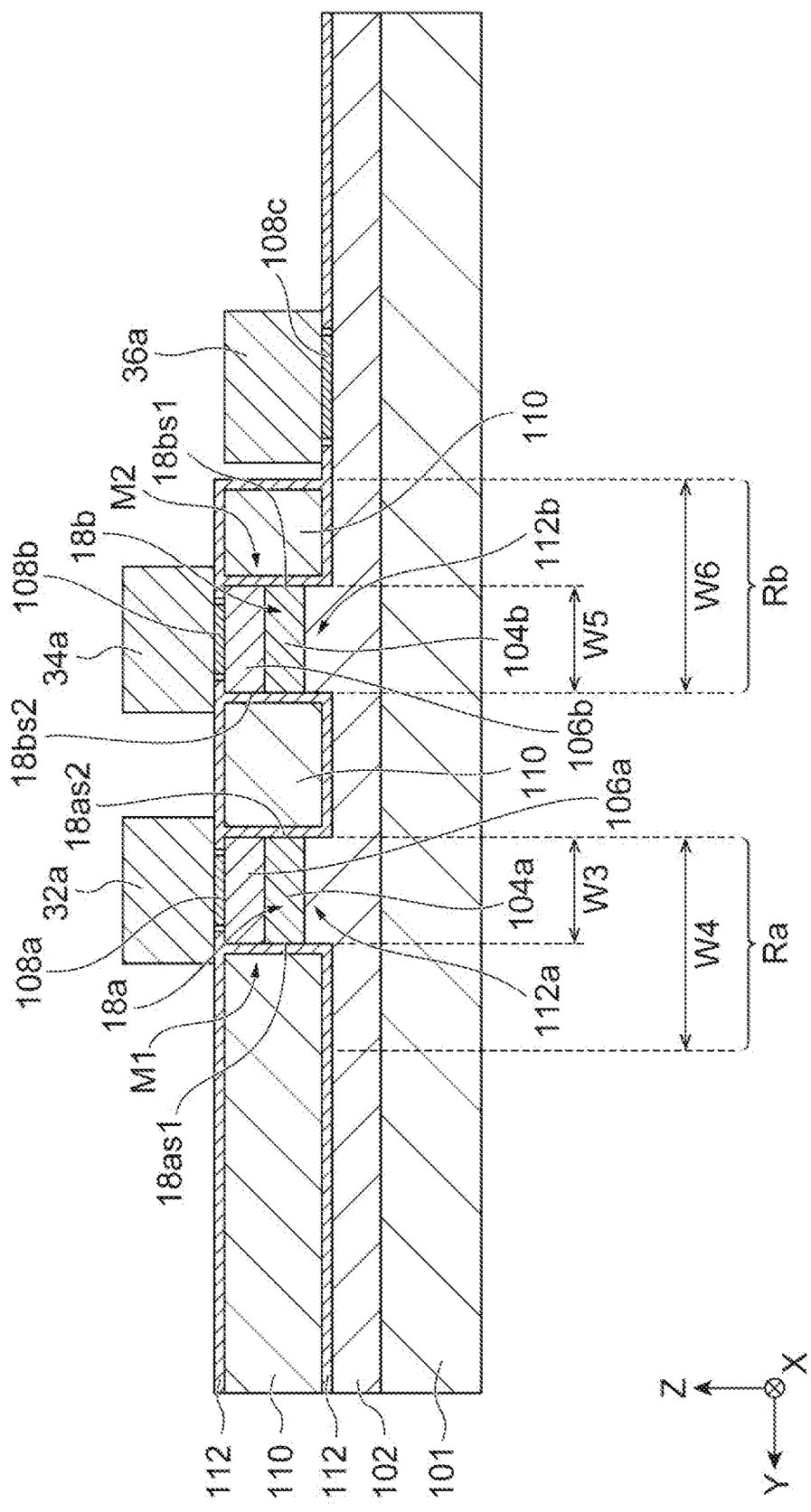
FIG. 2 is a cross-sectional view taken along a line II-II of FIG. 1.

FIG. 1 is a plan view schematically showing an optical modulator according to an embodiment. FIG. 2 is a cross-sectional view taken along a line II-II of FIG. 1. An optical modulator 10 shown in FIG. 1 is, for example, a Mach-Zehnder modulator. The optical modulator 10 includes an input waveguide 12, a tapered waveguide 14, an optical demultiplexer 16, a first arm waveguide 18a, and a second arm waveguide 18b.

The input waveguide 12 has a first width W1 enabling a propagation of a light-beam in a single-mode. The input waveguide 12 extends linearly, for example, along the X-axis direction. The first width W1 is the length of the input waveguide 12 in the Y-axis direction. The first width W1 may be greater than or equal to 1 μm and less than or equal to 2 μm, and is, for example, 1.5 μm. The input waveguide 12 has an input end 12a and an output end 12b. The input end 12a is an input end of the optical modulator 10. The input waveguide 12 has a first width W1 which remains constant from the input end 12a to the output end 12b.

The tapered waveguide 14 has an input end 14a and an output end 14b. The input end 14a is optically connected to the output end 12b of the input waveguide 12. The input end 14a has the first width W1. The output end 14b has a second width W2 larger than the first width W1. The second width W2 may be greater than or equal to 2 μm and less than or equal to 4 μm, and is, for example, 3 μm. A width of the tapered waveguide 14 is gradually increased from the input end 14a to the output end 14b so as to satisfy an adiabatic condition. Therefore, a higher-order mode does not occur in the tapered waveguide 14. The length of the tapered waveguide 14 in the X-axis direction may be greater than or equal to 20 μm and less than or equal to 100 μm.

An optical demultiplexer 16 is a multi-mode interference coupler (MMI coupler) such as a 1×2 multi-mode interference coupler. The optical demultiplexer 16 has an input port 16a, a first output port 16b1, and a second output port 16b2. The input port 16a is optically connected to the output end 14b of the tapered waveguide 14. The optical demultiplexer 16 has a width W (length in the the Y-axis direction) larger than the second width W2. The width W may be greater than or equal to 3 μm and less than or equal to 20 μm. A ratio of W1 to W may be greater than or equal to 0.2 and less than or equal to 0.4. By increasing the ratio of W1 to W, an excessive loss of a light at the input port 16a of the optical demultiplexer 16 can be reduced. The length L of the optical demultiplexer 16 in the X-axis direction may be greater than or equal to 50 μm and less than or equal to 500 μm. When increasing the ratio of W1 to W, the length L of the optical demultiplexer 16 is also increased. When the length L of the optical demultiplexer 16 is reduced, the absorption loss of a light in the optical demultiplexer 16 can be reduced, and the size of the optical modulator 10 can be reduced.

The first arm waveguide 18a has an input end 18aa and an output end 18ab. The input end 18aa is optically connected to the first output port 16b1 of the optical demultiplexer 16. The first arm waveguide 18a is optically connected to the first output port 16b1 without passing through a tapered waveguide. The first arm waveguide 18a has a third width W3 which remains constant from the input end 18aa to the output end 18ab. The third width W3 is larger than the first width W1. The third width W3 may be as large as the second width W2. Manufacturing errors are included in "the same". The first arm waveguide 18a is located, from the input end 18aa to the output end 18ab, within a first strip region Ra having a fourth width W4. The fourth width W4 is twice as large as the third width W3, but may be 1.5 times the third width W3, or may be equal to or less than 1.2 times the third width W3. The first arm waveguide 18a extends linearly from, for example, the input end 18aa to the output end 18ab. The length of the first arm waveguide 18a in the X-axis direction may be greater than or equal to 200 μm and less than or equal to 2000 μm.

The first arm waveguide 18a has a first edge 18as1 and a second edge 18as2 connecting the input end 18aa and the output end 18ab. The second edge 18as2 is located between the first edge 18as1 and the second arm waveguide 18b. The first strip region Ra has, for example, a rectangular shape. The first strip region Ra has a first edge Ra1 and a second edge Ra2 extending in the X-axis direction. The second edge Ra2 is located between the first edge Ra1 and the second arm waveguide 18b. In the present embodiment, the second edge Ra2 of the first strip region Ra overlaps the second edge 18as2 of the first arm waveguide 18a.

The second arm waveguide 18b has an input end 18ba and an output end 18bb. The input end 18ba is optically connected to the second output port 16b2 of the optical demultiplexer 16. The second arm waveguide 18b is optically connected to the second output port 16b2 without passing through a tapered waveguide. The second arm waveguide 18b has a fifth width W5 which remains constant from the input end 18ba to the output end 18bb. The fifth width W5 is larger than the first width W1. The fifth width W5 may be as large as the third width W3, or may be as large as the second width W2. Manufacturing errors are included in "the same". The second arm waveguide 18b is located, from the input end 18ba to the output end 18bb, within a second strip region Rb having a sixth width W6. The sixth width W6 is twice as large as the fifth width W5, but may be 1.5 times as large as the third width W3. The second arm waveguide 18b extends linearly from, for example, the input end 18ba to the output end 18bb. The length of the second arm waveguide 18b in the X-axis direction may be greater than or equal to 200 μm and less than or equal to 2000 μm.

The second arm waveguide 18b has a first edge 18bs1 and a second edge 18bs2 that connect the input end 18ba and the output end 18bb. The second edge 18bs2 is located between the first edge 18bs1 and the first arm waveguide 18a. The second strip region Rb has, for example, a rectangular shape. The second strip region Rb has a first edge Rb1 and a second edge Rb2 extending in the X-axis direction. The second edge Rb2 is located between the first edge Rb1 and the first arm waveguide 18a. In the present embodiment, the second edge Rb2 of the second strip region Rb overlaps the second edge 18bs2 of the second arm waveguide 18b.

The optical modulator 10 further comprises a first electrode 32a provided on the first arm waveguide 18a, a second electrode 34a provided on the second arm waveguide 18b, and a third electrode 36a. The first electrode 32a, the second electrode 34a and the third electrode 36a extend in the X-axis direction, and are spaced from each other in the Y-axis direction. In the Y-axis direction, the second electrode 34a is disposed between the first electrode 32a and the third electrode 36a. The first electrode 32a applies a voltage to the first arm waveguide 18a. The first electrode 32a has a width larger than a width of the first arm waveguide 18a. In the X-axis direction, the length of the first electrode 32a is smaller than the length of the first arm waveguide 18a. The second electrode 34a applies a voltage to the second arm waveguide 18b. The voltage applied to the second arm waveguide 18b is different from the voltage applied to the first arm waveguide 18a. The second electrode 34a has a width larger than a width of the second arm waveguide 18b. In the X-axis direction, the length of the second electrode 34a is smaller than the length of the second arm waveguide 18b. The third electrode 36a has a width larger than the width of the first arm waveguide 18a and the second arm waveguide 18b.

The first electrode 32a is electrically connected to an electrode pad 32b through a wiring 32c. The second electrode 34a is electrically connected to an electrode pad 34b through a wiring 34c. The third electrode 36a is electrically connected to an electrode pad 36b through a wiring 36c. A voltage from a high frequency power supply 42 is applied to the electrode pad 32b. A voltage from a high frequency power supply 44 is applied to the electrode pad 34b. The potential of the electrode pad 36b is the ground potential.

The optical modulator 10 further comprises an optical multiplexer 20, a tapered waveguide 22, and an output waveguide 24. The optical multiplexer 20, the tapered waveguide 22 and the output waveguide 24, have the same structure as the optical demultiplexer 16, the tapered waveguide 14, and the input waveguide 12, respectively, except that the propagation direction of a light is different.

The optical multiplexer 20 is the multi-mode interference coupler such as a 2×1 multi-mode interference coupler. The optical multiplexer 20 has a first input port 20a1, a second input port 20a2, and an output port 20b. The first input port 20a1 is optically connected to the output end 18ab of the first arm waveguide 18a. The second input port 20a2 is optically connected to the output end 18bb of the second arm waveguide 18b.

The tapered waveguide 22 has an input end 22a and an output end 22b. The input end 22a is optically connected to the output port 20b of the optical multiplexer 20. The input end 22a has the second width W2. The output end 22b has the first width W1. A width of the tapered waveguide 22 is gradually reduced from the input end 22a to the output end 22b so as to satisfy the adiabatic condition. Therefore, the higher-order mode does not occur in the tapered waveguide 22.

The output waveguide 24 has the first width W1 enabling a propagation of a light-beam in a single-mode. The output waveguide 24 extends linearly, for example, along the X-axis direction. The output waveguide 24 has an input end 24a and an output end 24b. The input end 24a is optically connected to the output end 22b of the tapered waveguide 22. The output end 24b is an output end of the optical modulator 10. The output waveguide 24 has the first width W1 which remains constant from the input end 24a to the output end 24b.

The input waveguide 12, the tapered waveguide 14, the optical demultiplexer 16, the first arm waveguide 18a, the second arm waveguide 18b, the optical multiplexer 20, the tapered waveguide 22 and the output waveguide 24 are monolithically integrated on a substrate 101 having a main surface extending in the X-axis direction and the Y-axis direction. At one end of the X-axis direction of the substrate 101, the input end 12a is provided. At the other end of the X-axis direction of the substrate 101, the output end 24b is provided.

As shown in FIG. 2, the first arm waveguide 18a has a mesa structure M1 provided on the substrate 101. The mesa structure M1 extends in the X-axis direction. The third width W3 of the first arm waveguide 18a is as large as a width of the mesa structure M1. A lower cladding layer 102 is provided on the substrate 101. The mesa structure M1 includes a protrusion part 112a located on the surface of the lower cladding layer 102, a core layer 104a provided on the protrusion part 112a, an upper cladding layer 106a provided on the core layer 104a, and an ohmic layer 108a provided on the upper cladding layer 106a. A contact layer is interposed between the upper cladding layer 106a and the ohmic layer 108a. The first electrode 32a is electrically connected to the ohmic layer 108a.

The second arm waveguide 18b has, like the first arm waveguide 18a, a mesa structure M2 provided on the substrate 101. The mesa structure M2 extends in the X-axis direction. The fifth width W5 of the second arm waveguide 18b is as large as a width of the mesa structure M2. The mesa structure M2 includes a protrusion part 112b located on the surface of the lower cladding layer 102, a core layer 104b provided on the protrusion part 112b, an upper cladding layer 106b provided on the core layer 104b, and an ohmic layer 108b provided on the upper cladding layer 106b. Contact layer is interposed between the upper cladding layer 106b and the ohmic layer 108b. The second electrode 34a is electrically connected to the ohmic layer 108b.

Buried regions 110 burying the side surfaces of the mesa structures M1 and M2 are provided on a portion of the lower cladding layer 102 where the protrusion parts 112a and 112b are not provided. The buried regions 110 are covered with an insulating film 112. Thus, the insulating film 112 has a first portion located between the lower cladding layer 102 and the buried regions 110, a second portion located between the side surfaces of the mesa structures M1 and M2 and the buried regions 110, and a third portion located on the buried regions 110. The insulating film 112 has openings on the mesa structures M1 and M2, and the ohmic layers 108a and 108b located in the openings respectively. The insulating film 112 has an opening on a portion of the lower cladding layer 102 where neither the buried regions 110 nor the mesa structures M1 and M2 are provided, and an ohmic layer 108c is located in the opening. A contact layer is interposed between the lower cladding layer 102 and the ohmic layer 108c. The ohmic layer 108c electrically connects the third electrode 36a and the lower cladding layer 102.

In one example, the optical modulator 10 has the following dimensions:
The width of the first electrode 32a, the second electrode 34a, and the third electrode 36a (lengths in the Y-axis direction): 4 μm
A height of the first electrode 32a, the second electrode 34a, and the third electrode 36a (lengths in the Z-axis direction): 2 μm
A distance between the first electrode 32a and the second electrode 34a: 3 μm
The widths (lengths in the Y-axis direction) of the ohmic layers 108a and 108b: 2 μm
A width of the ohmic layer 108c (length in the Y-axis direction): 3 μm
A width of the mesa structures M1 and M2 (lengths in the Y-axis direction): 3 μm
A height of the mesa structures M1 and M2 (lengths in the Z-axis direction): 3 μm
The distance between the mesa structure M1 and the mesa structure M2 (distance between the first arm waveguide 18a and the second arm waveguide 18b): 4 μm
The thickness of the lower cladding layer 102, i.e., the portion where the protrusion part 112a is not formed: 1.5 μm The substrate 101 is a semi-insulating group III-V compound semiconductor substrate such as a semi-insulating InP substrate. The lower cladding layer 102 is an n-type group III-V compound semiconductor layer such as an n-type InP layer. Examples of n-type dopants include Si. The core layers 104a and 104b comprise i-type semiconductor material. The core layers 104a and 104b have multiple quantum-well structures (i-MQW) including, for example, i-type AlGaInAs layers and AlGaInAs layers. The thickness of each of the core layers 104a and 104b is, for example, 0.5 μm or less. The upper cladding layers 106a and 106b are p-type group III-V compound semiconductor layers such as p-type InP layers. Examples of p-type dopants include Zn. The ohmic layers 108a, 108b, and 108c are metallic layers such as Ti/Pt/Au. The contact layer is, a p-type Group III-V compound semiconductor layer such as a p-type InGaAs layer, an n-type Group III-V compound semiconductor layer such as n-type InP, or the like. The first electrode 32a, the second electrode 34a, and the third electrode 36a are metal electrodes such as Au electrodes. The buried regions 110 are resin regions such as a benzocyclobutene (BCB) region. The insulating film 112 is an inorganic film such as a $SiO_2$ film.

The wavelength of a light propagating through the optical modulator 10 is, for example, in the range of 1.53 to 1.57 μm. In this case, refractive indices of the materials are as follows.
BCB: 2.7
$SiO_2$: 1.5
p-InP: 3.2 (doping concentration: $5 \times 10^{17}$ to $2 \times 10^{18}$)
i-MQW: 3.4
n-InP: 3.2 (doping concentration: $5 \times 10^{17}$ to $2 \times 10^{18}$)
Semi-insulating InP: 3.2

In the optical modulator 10, the first arm waveguide 18a and the second arm waveguide 18b constitute a modulation unit. When the voltage is applied to the first arm waveguide 18a using the high frequency power supply 42, the refractive index of the core layer 104a can be changed. When the voltage is applied to the second arm waveguide 18b using the high frequency power supply 44, the refractive index of the core layer 104b can be changed. By the refractive index difference caused by the difference between voltages applied to the first arm waveguide 18a and the second arm waveguide 18b, the phase difference of the a light propagating through the first arm waveguide 18a and the second arm waveguide 18b can be adjusted. Therefore, the intensity of a light at the output end 24b of the output waveguide 24 can be adjusted.

According to the optical modulator 10 of the present embodiment, the third width W3 of the first arm waveguide 18a can be increased, and thus deterioration of the material of the first arm waveguide 18a such as the semiconductor material of the core layer 104a can be suppressed. Furthermore, since the first arm waveguide 18a is located within the first band-shaped region Ra having the fourth width W4 twice as large as the third width W3, the first arm waveguide 18a will not be bent greatly. Therefore, the occurrence of the higher-order mode caused by the curved portion can be suppressed in the first arm waveguide 18a.

Furthermore, the fifth width W5 of the second arm waveguide 18b can be increased, and thus the deterioration of the material of the second arm waveguide 18b such as a semiconductor material of the core layer 104b, can be suppressed. Furthermore, since the second arm waveguide 18b is located within the second strip region Rb having the sixth width W6 twice as large as the fifth width W5, the second arm waveguide 18b is not be bent greatly. Therefore, the occurrence of the higher-order mode caused by the curved portion can be suppressed in the second arm waveguide 18b.

Therefore, according to the optical modulator 10, while suppressing the deterioration of the material of the first arm waveguide 18a and the second arm waveguide 18b, the occurrence of the higher-order mode in the first arm waveguide 18a and the second arm waveguide 18b can be suppressed. Interference in the MMI coupler is almost perfectly done, when the propagating light which does not include the higher-order mode is obtained. Therefore, the characteristics of the optical modulator 10 such as the extinction ratio is improved.

In the optical modulator 10, continuous light of a single mode is inputted to the input end 12a of the input waveguide 12. The continuous light of the input single mode is outputted from the output end 24b of the output waveguide 24 after being modulated by the optical modulator 10. By using the optical modulator 10, for example, in optical communication, modulation of a light intensity or phase (e.g., signal generation) can be modulated and the light intensity can be adjusted. In a specific example of the adjustment of the light intensity, the light is attenuated to an intensity suitable for transmission. In one example, when the length of the first arm waveguide 18a and the second arm waveguide 18b in the X-axis direction is 200 μm, and the difference $V_\pi$ between high-frequency voltages applied to the first electrode 32a and the second electrode 34a is 3 volts, the extinction ratio of a signal light outputted from the output end 24b is 10 dB. In another example, when the length of the first arm waveguide 18a and the second arm waveguide 18b in the X-axis direction is 2000 μm, and the differential $V_\pi$ of the high-frequency voltages applied to the first electrode 32a and the second electrode 34a is 1 volt, the extinction ratio of the signal light outputted from the output end 24b is 30 dB.

The third width W3 of the first arm waveguide 18a and the fifth width W5 of the second arm waveguide 18b may be greater than or equal to 1.55 μm. For example, when the power of a light inputted to the input end 12a of the input waveguide 12 is 20 dBm, the power of the light in the first arm waveguide 18a and the second arm waveguide 18b is 17 dBm at a maximum. In this case, provided the thickness of the core layers 104a and 104b is 0.4 μm, the power density of the light in the first arm waveguide 18a and the power density of a light in the second arm waveguide 18b can be less than or equal to 800 W/cm$^2$ when the third width W3 and the fifth width W5 are greater than or equal to 1.55 μm.

When the third width W3 is as large as the second width W2, the occurrence of the higher-order mode in the first output port 16b1 of the optical demultiplexer 16 can be suppressed. When the fifth width W5 is as large as the second width W2, the occurrence of the higher-order mode in the second output port 16b2 of the optical demultiplexer 16 can be suppressed.

When the first arm waveguide 18a extends linearly from the input end 18aa to the output end 18ab, the occurrence of the higher-order mode in the first arm waveguide 18a can be suppressed further. When the second arm waveguide 18b extends linearly from the input end 18ba to the output end 18bb, the occurrence of the higher-order mode in the second arm waveguide 18b can be suppressed further.

Figure 3:
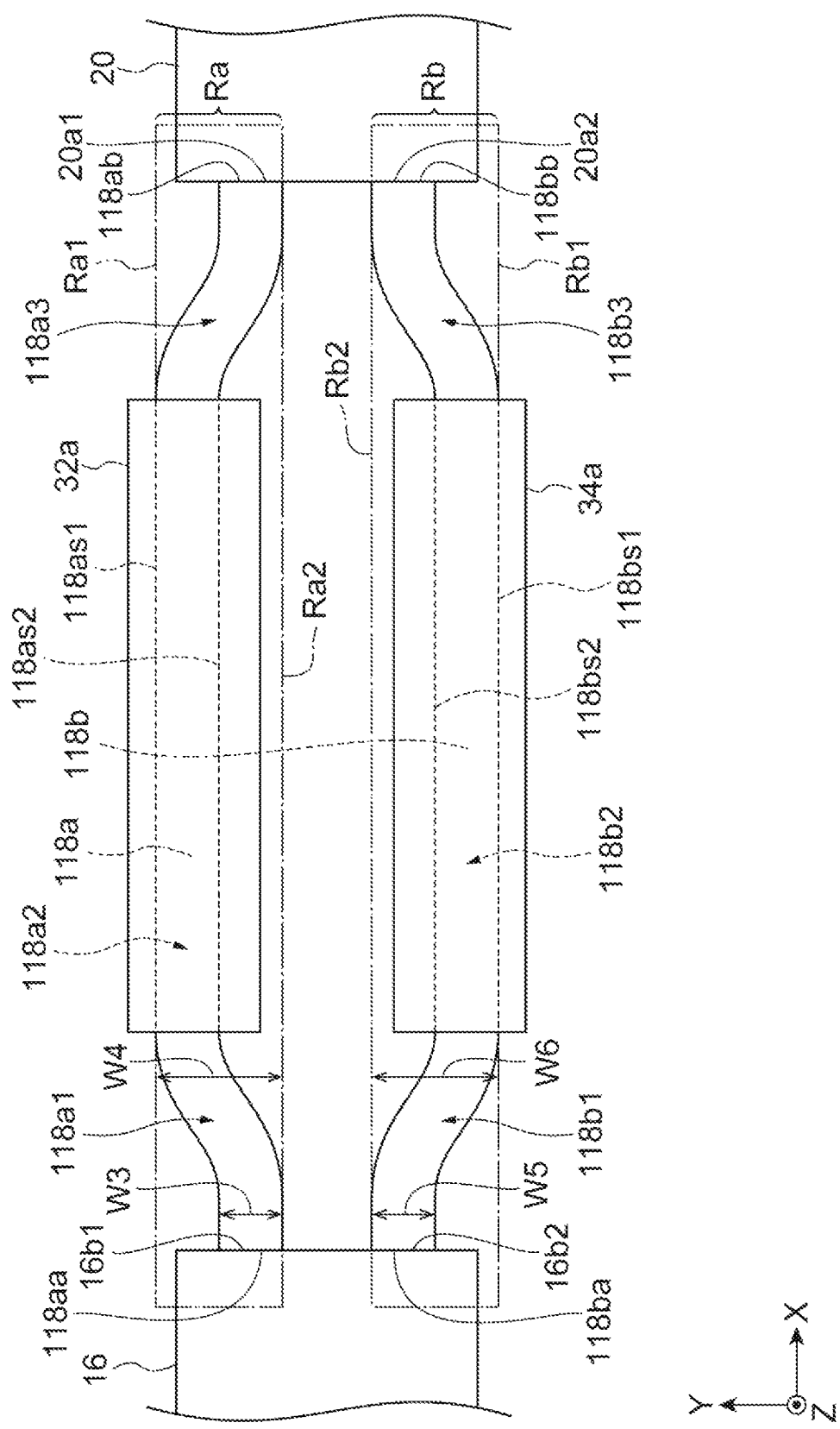
FIG. 3 is a plan view schematically showing a part of an optical modulator according to a first modification.

FIG. 3 is a plan view schematically showing a part of the optical modulator according to the first modification. The optical modulator according to the present modification has the same configuration as the optical modulator 10 except that a first arm waveguide 118a and a second arm waveguide 118b are provided in place of the first arm waveguide 18a and the second arm waveguide 18b, respectively.

The first arm waveguide 118a has an input end 118aa optically connected to the first output port 16b1 of the optical demultiplexer 16 and an output end 118ab optically connected to the first input port 20a1 of the optical multiplexer 20. The first arm waveguide 118a has the third width W3 from the input end 118aa to the output end 118ab. The first arm waveguide 118a has a curved portion 118a1 including the input end 118aa, a curved portion 118a3 including the output end 118ab, and a straight portion 118a2 disposed between the curved portion 118a1 and the curved portion 118a3. The curved portion 118a1 and the curved portion 118a3 draw, for example, an S-shaped curve. The curved portion 118a1 extends in the X-axis direction from the input end 118aa, then curves away from the second arm waveguide 118b in the Y-axis direction, and extends in the X-axis direction again. The straight portion 118a2 extends in the X-axis direction. After extending in the X-axis direction, the curved portion 118a3 bends so as to approach the second arm waveguide 118b in the Y-axis direction, and again extends in the X-axis direction to reach the output end 118ab. In the present modification, the first arm waveguide 118a is located within the first strip region Ra having the fourth width W4 twice as large as the third width W3 from the input end 118aa to the output end 118ab. The first edge Ra1 of the first strip region Ra is at the same position as the position farthest from the second arm waveguide 18b (the first edge 18as1 in the straight portion 118a2) of the first edge 18as1 of the first arm waveguide 18a in the widthwise direction (the Y-axis direction) of the first arm waveguide 18a. The second edge Ra2 of the first strip region Ra is at the same position as the position closest to the second arm waveguide 18b (the second edge 18as2 of the input end 118aa and the output end 118ab) of the second edge 18as2 of the first arm waveguide 18a in the widthwise direction (the Y-axis direction) of the first arm waveguide 18a. With such small curved portions 118a1 and 118a3, the occurrence of the higher-order mode in the first arm waveguide 118a is suppressed. In addition, since the third width W3 of the first arm waveguide 118a can be increased, the deterioration of the material of the first arm waveguide 118a can be suppressed.

The second arm waveguide 118b has an input end 118ba which is optically connected to the second output port 16b2 of the optical demultiplexer 16, and an output end 118bb which is optically connected to the second input port 20a2 of the optical multiplexer 20. The second arm waveguide 118b has the fifth width W5 from the input end 118ba to the output end 118bb. The second arm waveguide 118b has a curved portion 118b1 including the input end 118ba, a curved portion 118b3 including the output end 118bb, a straight portion 118b2 disposed between the curved portion 118b1 and the curved portion 118b3. The curved portion 118b1 and the curved portion 118b3 draw, for example, an S-shaped curve. The curved portion 18ba1 extends in the X-axis direction from the input end 118ba, then curves away from the first arm waveguide 118a in the Y-axis direction, and extends in the X-axis direction again. The straight portion 118b2 extends in the X-axis direction. After the curved portion 118b3 extends in the X-axis direction, it curves so as to approach the first arm waveguide 118a in the Y-axis direction, and again extends in the X-axis direction to reach the output end 118bb. In this modification, the second arm waveguide 118b is located, from the input end 118ba to the output end 118bb, in the second strip region Rb having the sixth width W6 twice as large as the fifth width W5. The first edge Rb1 of the second strip region Rb is at the same position as the position farthest from the first waveguide 18a (the first edge 18bs1 in the straight portion 118b2) of the first edge 18bs1 of the second arm waveguide 18b in the widthwise direction of the second arm waveguide 18b (the Y-axis direction). The second edge Rb2 of the second strip region Rb is at the same position as the position closest to the first arm waveguide 18a (the second edge 18bs2 of the input end 118*ba* and the output end 118*bb*) in the widthwise direction of the second arm waveguide 18*b* (the Y-axis direction). With such small curved portions 118*b*1 and 118*b*3, the occurrence of the higher-order mode in the second arm waveguide 118*b* is suppressed. In addition, since the fifth width W5 of the second arm waveguide 118*b* can be increased, the deterioration of the material of the second arm waveguide 118*b* can be suppressed.

Figure 4:
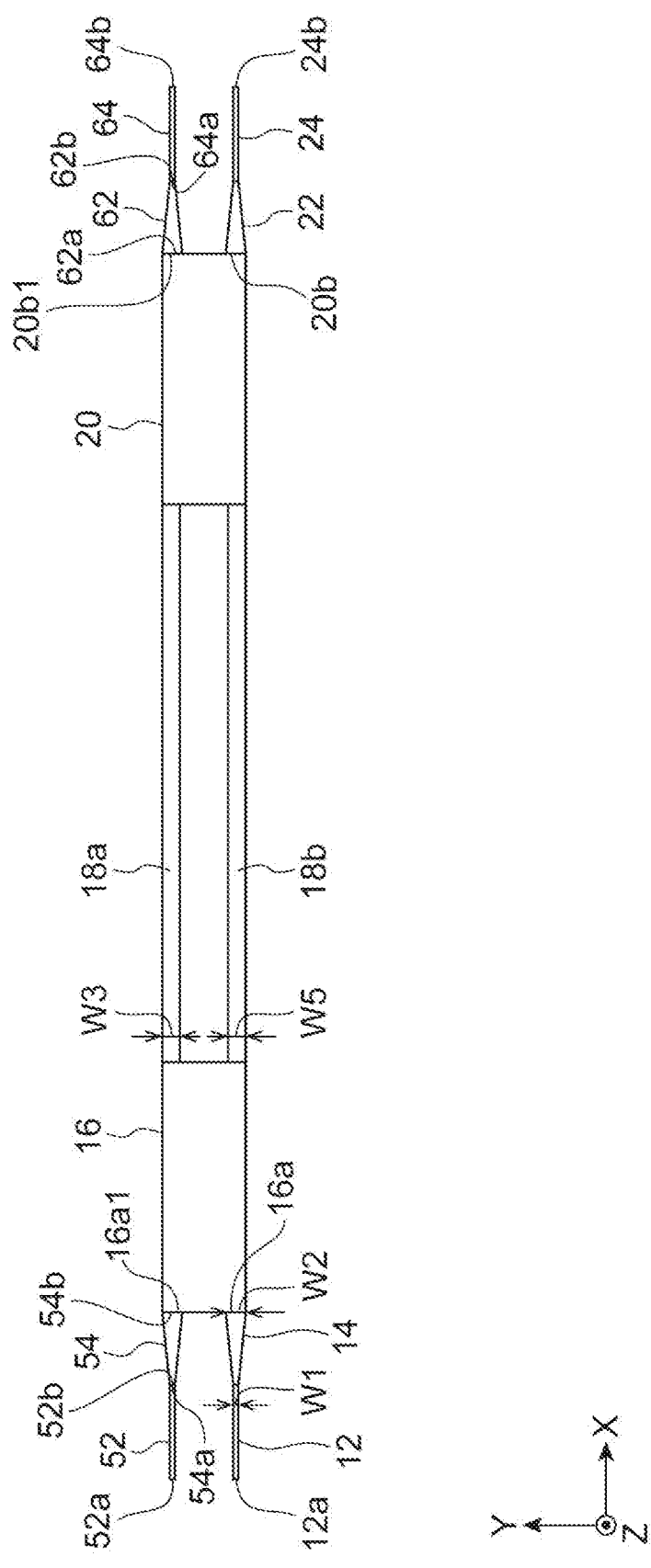
FIG. 4 is a plan view schematically showing a part of an optical modulator according to a second modification.

FIG. 4 is a plan view schematically showing a part of the optical modulator according to a second modification. The optical modulator according to the present modification has the same configuration as the optical modulator 10 except that the optical demultiplexer 16 and the optical multiplexer 20 are 2×2 multi-mode interference couplers, and that the optical modulator further comprises a dummy input waveguide 52, a dummy tapered waveguide 54, a dummy tapered waveguide 62, and a dummy output waveguide 64.

The dummy input waveguide 52 has the same configuration as the input waveguide 12. The dummy input waveguide 52 has an input end 52*a* and an output end 52*b*. The dummy tapered waveguide 54 has the same configuration as the tapered waveguide 14. The dummy tapered waveguide 54 has an input end 54*a* and an output end 54*b*. The optical demultiplexer 16 has a dummy input port 16*a*1. The output end 52*b* of the dummy input waveguide 52 is optically connected to the input end 54*a* of the dummy tapered waveguide 54. The output end 54*b* of the dummy tapered waveguide 54 is optically connected to the dummy input port 16*a*1 of the optical demultiplexer 16.

The optical multiplexer 20 has a dummy output port 20*b*1. The dummy tapered waveguide 62 has the same configuration as the tapered waveguide 22. The dummy tapered waveguide 62 has an input end 62*a* and an output end 62*b*. The dummy output waveguide 64 has the same configuration as the output waveguide 24. The dummy output waveguide 64 has an input end 64*a* and an output end 64*b*. The dummy output port 20*b*1 of the optical multiplexer 20 is optically connected to the input end 62*a* of the dummy tapered waveguide 62. The output end 62*b* of the dummy tapered waveguide 62 is optically connected to the input end 64*a* of the dummy output waveguide 64.

Figure 5:
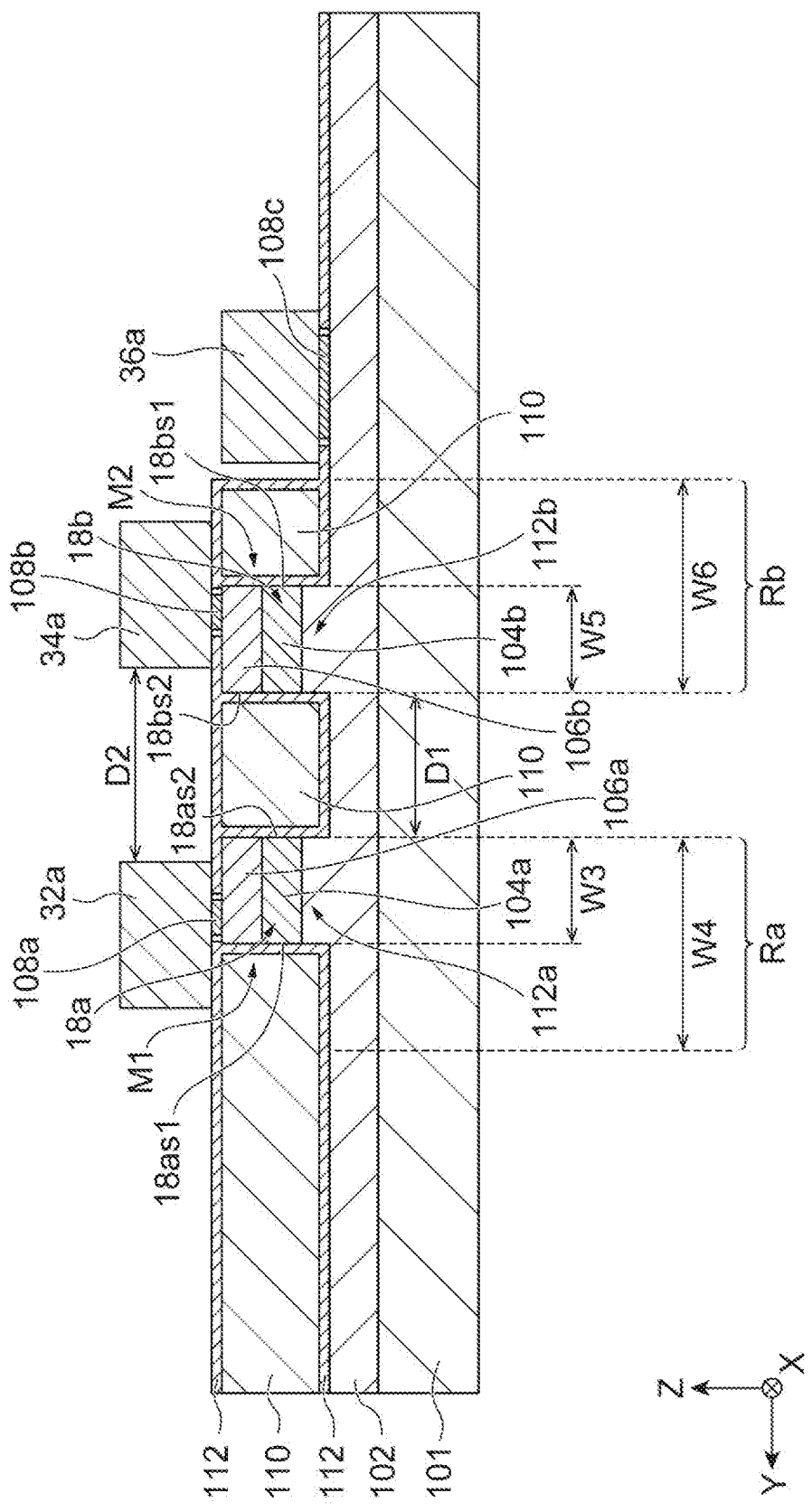
FIG. 5 is a cross-sectional view schematically showing an optical modulator according to a third modification.

FIG. 5 is a cross-sectional view schematically showing the optical modulator according to a third modification. The optical modulator according to the present modification includes the same configuration as the optical modulator 10 except that the distance between the first electrode 32*a* and the second electrode 34*a* is different.

In the present modification, the distance D2 between the first electrode 32*a* and the second electrode 34*a* is larger than the distance D1 between the first arm waveguide 18*a* and the second arm waveguide 18*b*, i.e., the distance between the mesa structure M1 and the mesa structure M2. In this case, since the distance D2 between the first electrode 32*a* and the second electrode 34*a* can be increased, the workability at the time of forming the first electrode 32*a* and the second electrode 34*a* by, for example, photolithography or lift-off is improved.

In the present modification, the central axis extending in the Z-axis direction through the center of the first electrode 32*a* in the X-axis direction and a central axis extending in the Z-axis direction through the center of the mesa structure M1 in the X-axis direction are offset from each other in the X-axis direction. Even in such a case, since the electrical resistance of the core layer 104*a* (for example, 1 kΩ more) is larger than the electrical resistance of the upper cladding layer 106*a* (for example, 10Ω or less), the current (applied voltage) supplied by the first electrode 32*a* spreads in the Y-axis direction in the upper cladding layer 106*a*. Therefore, a substantially uniform current (voltage) is supplied to the core layer 104*a* in the Y-axis direction.

In one example, the optical modulator according to the present modification has the following dimensions. Incidentally, "inner edge" is the edge closer to the central axis extending in the Z-axis direction through the intermediate point between the first electrode 32*a* and the second electrode 34*a* in the X-axis direction. "Outer edge" is the edge far from the central axis extending in the Z-axis direction through the intermediate point between the first electrode 32*a* and the second electrode 34*a* in the X-axis direction.

Figure 6:
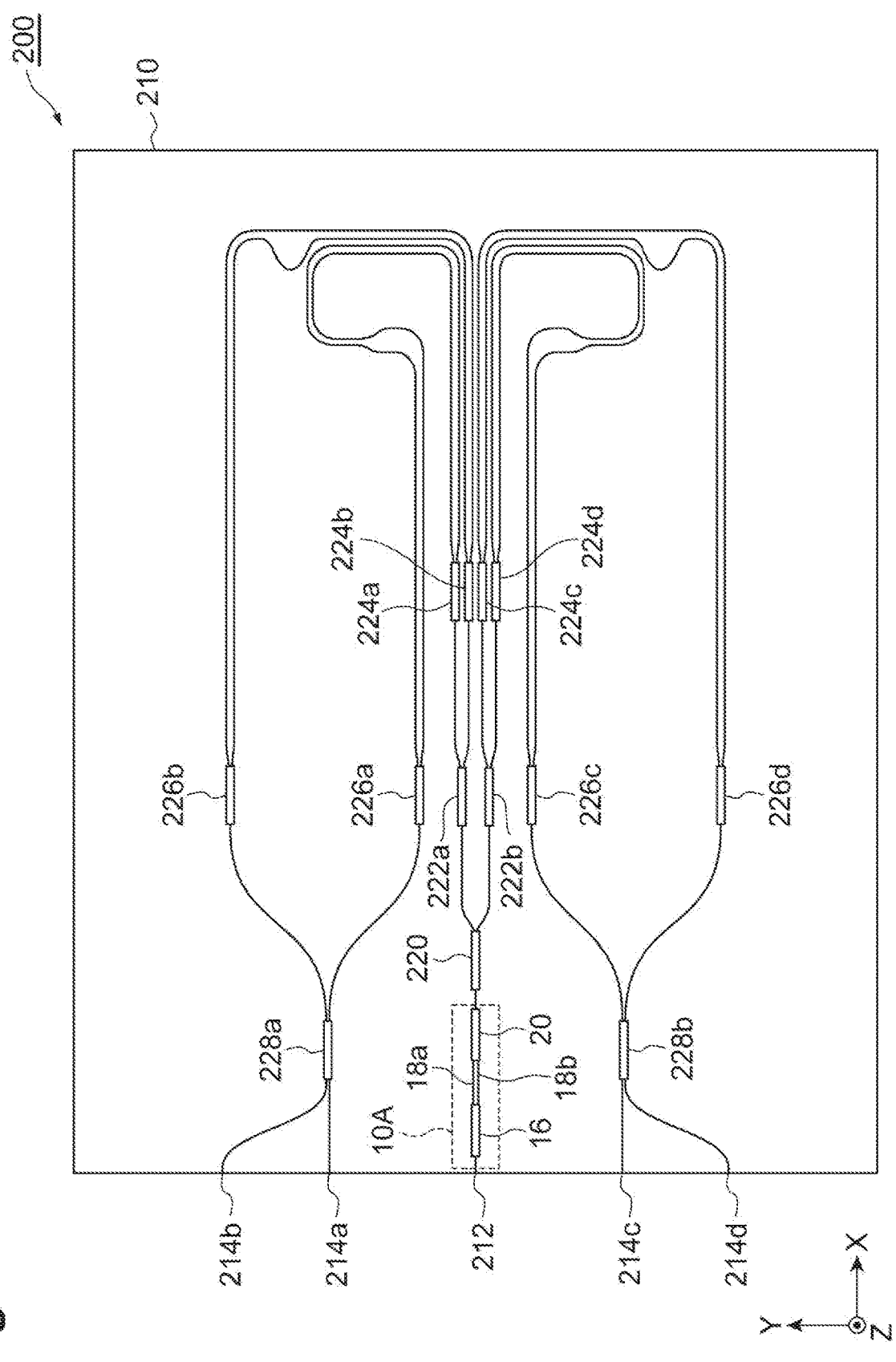
FIG. 6 is a plan view schematically showing an optical modulator according to another embodiment.

The width of the first electrode 32*a*, the second electrode 34*a*, and the third electrode 36*a* (length in the Y-axis direction): 4 μm
The height of the first electrode 32*a*, the second electrode 34*a*, and the third electrode 36*a* (length in the Z-axis direction): 2 μm
The distance D2 between the first electrode 32*a* and the second electrode 34*a*: 5 μm
The width (length in the Y-axis direction) of the ohmic layers 108*a* and 108*b*: 1 μm
The distance from the inner edge of the ohmic layer 108*a* to the inner edge of the first electrode 32*a*: 1 μm
The distance from the inner edge of the ohmic layer 108*a* to the inner edge of the mesa structure M1: 1.5 μm
The distance from the outer edge of the ohmic layer 108*a* to the outer edge of the first electrode 32*a*: 2 μm
The distance from the inner edge of the ohmic layer 108*b* to the inner edge of the second electrode 34*a*: 1 μm
The distance from the inner edge of the ohmic layer 108*b* to the inner edge of the mesa structure M2: 1.5 μm
The distance from the outer edge of the ohmic layer 108*b* to the outer edge of the second electrode 34*a*: 2 μm
The width of the ohmic layer 108*c* (length in the Y-axis direction): 3 μm
The width of the mesa structures M1 and M2 (length in the Y-axis direction): 3 μm
The height of the mesa structures M1 and M2 (length in the Z-axis direction): 3 μm
The distance between the mesa structures M1 and M2 (distance D1 between the first arm waveguide 18*a* and the second arm waveguide 18*b*): 4 μm
The thickness of the upper cladding layer 106*b*: 1.5 μm
The thickness of a portion of the lower cladding layer 102 where the protrusion part 112*a* is not formed: 1.5 μm FIG. 6 is a plan view schematically showing an optical modulator according to another embodiment. The optical modulator 200 shown in FIG. 6 is, for example, a coherent light modulator. The optical modulator 200 includes an entrance port 212, an exit ports 214*a*, 214*b*, 214*c*, 214*d*, an optical attenuator 10A (see FIG. 7), and optical couplers 220, 222*a*, 222*b*, 224*a*, 224*b*, 224*c*, 224*d*, 226*a*, 226*b*, 226*c*, 226*d*, 228*a*, 228*b* such as multi-mode interference couplers. The optical attenuator 10A, the optical couplers 220, 222*a*, 222*b*, 224*a* to 224*d*, 226*a* to 226*d*, 228*a*, 228*b* are monolithically integrated into a substrate 210.

The entrance port 212 is optically connected to an input end of the optical attenuator 10A through a waveguide. An output end of the optical attenuator 10A is optically connected to an input end of the optical coupler 220 through a waveguide. Input ends of the optical couplers 222*a* and 222*b* are optically connected to an output end of the optical coupler 220 via waveguides, respectively. Input ends of the optical couplers 224*a* and 224*b* are optically connected to an output end of the optical coupler 222*a* via waveguides, respectively. Input ends of the optical couplers 224*c* and 224d are optically connected to an output end of the optical coupler 222b via waveguides, respectively. Output ends of the optical coupler 224a are optically connected to an input end of the optical coupler 226a via two arm waveguides. Output ends of the optical coupler 224b are optically connected to an input end of the optical coupler 226b through two arm waveguides. Output ends of the optical coupler 224c are optically connected to an input end of the optical coupler 226c via two arm waveguides. Output ends of the optical coupler 224d are optically connected to an input end of the optical coupler 226d via two arm waveguides. Output ends of the optical couplers 226a and 226b are optically connected to an input end of the optical coupler 228a via waveguides, respectively. Output ends of the optical couplers 226c and 226d are optically connected to an input end of the optical coupler 228b via waveguides, respectively. Output ends of the optical coupler 228a are optically connected to the exit ports 214a and 214b via waveguides, respectively. Output ends of the optical coupler 228b are optically connected to the exit ports 214c and 214d, respectively, via waveguides.

In the optical modulator 200, eight arm waveguides between the optical couplers 224a to 224d and the optical couplers 226a to 226d constitute a modulation unit. A width of each arm waveguide is, for example, 1.5 µm. Continuous light inputted to the entrance port 212 is inputted to the optical coupler 220 after being attenuated by the optical attenuator 10A. Therefore, the power density of a light in each of the eight arm waveguides constituting the modulating unit is reduced. Therefore, in the modulation unit, the deterioration of the material of the arm waveguide due to the light absorption current hardly occurs.

Figure 7:
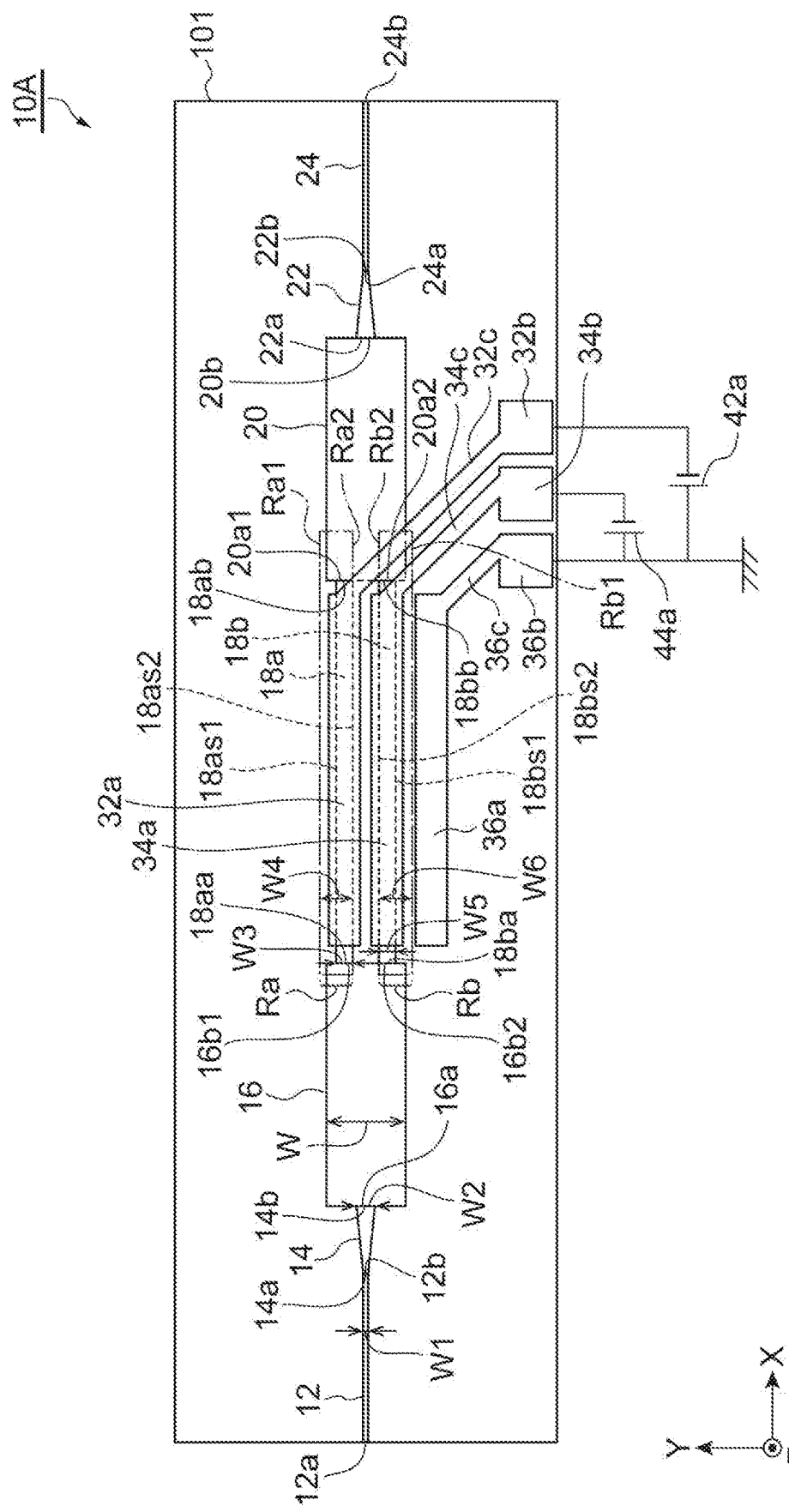
FIG. 7 is a plan view schematically showing a part of an optical modulator according to another embodiment.

FIG. 7 is a plan view schematically showing a part of an optical modulator according to another embodiment. An optical attenuator 10A shown in FIG. 7 has the same configuration as an optical modulator 10 except that DC power supplies 42a and 44a are provided in place of high frequency power supplies 42 and 44, respectively. When a voltage is applied to the first arm waveguide 18a by the DC power supply 42a, the refractive index of the core layer 104a can be changed. When a voltage is applied to the second arm waveguide 18b by the DC power supply 44a, the refractive index of the core layer 104b can be changed. Thus, the phase difference of a light propagating through the first arm waveguide 18a and the second arm waveguide 18b can be adjusted. Therefore, by adjusting the phase difference so as to offset the intensity of a light propagating through the first arm waveguide 18a and the intensity of a light propagating through the second arm waveguide 18b, the intensity of the light at the output end 24b of the output waveguide 24 can be attenuated. In one example, when the length of the first arm waveguide 18a and the second arm waveguide 18b in an X-axis direction is 200 µm, and the difference V between DC voltages applied to the first electrode 32a and the second electrode 34a is 3 volts, the attenuation amount of a light outputted from an output end 24b is 10 dB.

By adjusting the length of the first arm waveguide 18a and the second arm waveguide 18b, and the difference between the voltages applied to the first arm waveguide 18a and the second arm waveguide 18b, the attenuation amount of a light by the optical attenuator 10A can be adjusted. For example, by increasing the length of the first arm waveguide 18a and the second arm waveguide 18b, or increasing the difference between the voltages applied to the first arm waveguide 18a and the second arm waveguide 18b, the attenuation amount can be increased.

In the optical modulator 200 including the optical attenuator 10A, a third width W3 of the first arm waveguide 18a can be increased, and thus deterioration of the material of the first arm waveguide 18a (for example, the semiconductor material of the core layer 104a) can be suppressed. Furthermore, since the first arm waveguide 18a is located within a first strip region Ra having a fourth width W4 twice as large as the third width W3, the first arm waveguide 18a will not be bent too much. Therefore, in the first arm waveguide 18a, the occurrence of a higher-order mode caused by the curved portion can be suppressed.

Similarly, a fifth width W5 of the second arm waveguide 18b can be increased, and thus the deterioration of the material of the second arm waveguide 18b (e.g., a semiconductor material of the core layer 104b) can be suppressed. Furthermore, since the second arm waveguide 18b is located within a second strip region Rb having a sixth width W6 twice as large as the fifth width W5, the second arm waveguide 18b will not be bent too much. Therefore, in the second arm waveguide 18b, the occurrence of a higher-order mode caused by the curved portion can be suppressed.

Preferred embodiments of the present disclosure have been described in detail above. However, the present disclosure is not limited to the above embodiments.

What is claimed is:

1. An optical modulator comprising:
   an input waveguide having a first width enabling a propagation of a light-beam in a single-mode;
   a tapered waveguide having an input end and an output end, the input end being connected to the input waveguide, the output end having a second width larger than the first width;
   an optical demultiplexer having an input port, a first output port, and a second output port, the input port being optically connected to the output end;
   a first arm waveguide having an input end and an output end, the input end of the first arm waveguide being connected to the first output port;
   a second arm waveguide having an input end and an output end, the input end of the second arm waveguide being connected to the second output port;
   a first electrode disposed on the first arm waveguide; and
   a second electrode disposed on the second arm waveguide,
   wherein
   the first arm waveguide has a third width from the input end of the first arm waveguide to the output end of the first arm waveguide, the third width being larger than the first width,
   the first arm waveguide is located within a first strip region from the input end of the first arm waveguide to the output end of the first arm waveguide, the first strip region having a fourth width twice as large as the third width,
   the second arm waveguide has a fifth width from the input end of the second arm waveguide to the output end of the second arm waveguide, the fifth width being larger than the first width, and
   the second arm waveguide is located within a second strip region from the input end of the second arm waveguide to the output end of the second arm waveguide, the second strip region having a sixth width twice as large as the fifth width.

2. The optical modulator according to claim 1, wherein the third width is as large as the second width, and the fifth width is as large as the second width.

3. The optical modulator according to claim 1, wherein
the first arm waveguide extends linearly from the input end of the first arm waveguide to the output end of the first arm waveguide, and
the second arm waveguide extends linearly from the input end of the second arm waveguide to the output end of the second arm waveguide.

4. The optical modulator according to claim 1, wherein a distance between the first electrode and the second electrode is larger than a distance between the first arm waveguide and the second arm waveguide.

5. The optical modulator according to claim 1, wherein the first arm waveguide is optically connected to the first output port without passing through a tapered waveguide.

6. The optical modulator according to claim 1, wherein the second arm waveguide is optically connected to the second output port without passing through a tapered waveguide.

7. The optical modulator according to claim 1, wherein the first width is greater than or equal to 1 μm and less than or equal to 2 μm.

8. The optical modulator according to claim 1, wherein the second width is greater than or equal to 2 μm and less than or equal to 4 μm.

9. The optical modulator according to claim 1, wherein the third width and the fifth width are greater than or equal to 1.55 μm.

10. The optical modulator according to claim 1, wherein a width of the tapered waveguide is gradually increased from the input end of the tapered waveguide to the output end of the tapered waveguide.

11. The optical modulator according to claim 1, further comprising:
an optical multiplexer having a first input port, a second input port, and an output port, the first input port of the optical multiplexer being optically connected to the output end of the first arm waveguide, the second input port of the optical multiplexer being optically connected to the output end of the second arm waveguide.

12. The optical modulator according to claim 11, wherein the tapered waveguide is a first tapered waveguide, the optical modulator further comprising:
an output waveguide; and
a second tapered waveguide having an input end and an output end, the input end of the second tapered waveguide being optically connected to the output port of the optical multiplexer, the output end of the second tapered waveguide being optically connected to the output waveguide.

\* \* \* \* \*